US007674348B2

(12) United States Patent
Aketa et al.

(10) Patent No.: US 7,674,348 B2
(45) Date of Patent: Mar. 9, 2010

(54) AIR BAG SEALER SILICONE RUBBER COMPOSITION

(75) Inventors: Takashi Aketa, Gunma-ken (JP); Hiroyasu Hara, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/829,154

(22) Filed: Apr. 22, 2004

(65) Prior Publication Data

US 2004/0214922 A1 Oct. 28, 2004

(30) Foreign Application Priority Data

Apr. 25, 2003 (JP) ............................ 2003-121406

(51) Int. Cl.
*B29C 65/00* (2006.01)
*C09J 183/04* (2006.01)

(52) U.S. Cl. ....................... 156/325; 156/326; 156/329; 528/15; 528/21

(58) Field of Classification Search .................. 528/15, 528/21; 156/329, 325, 326
See application file for complete search history.

(56) References Cited

U.S. PATENT DOCUMENTS

| | | | | |
|---|---|---|---|---|
| 3,159,601 | A | 12/1964 | Ashby | |
| 3,159,662 | A | 12/1964 | Ashby | |
| 3,220,972 | A | 11/1965 | Lamoreaux | |
| 3,755,452 | A | 8/1973 | Sinn et al. | |
| 4,216,140 | A * | 8/1980 | Simizu | 523/200 |
| 4,257,936 | A | 3/1981 | Matsumoto et al. | |
| 5,399,402 | A | 3/1995 | Inoue et al. | |
| 5,438,094 | A * | 8/1995 | Fujiki et al. | 524/730 |
| 5,789,084 | A | 8/1998 | Nakamura et al. | |
| 5,877,256 | A | 3/1999 | Nakamura et al. | |
| 6,387,520 | B1 | 5/2002 | Fujiki et al. | |
| 6,425,600 | B1 | 7/2002 | Fujiki et al. | |
| 6,501,495 | B1 * | 12/2002 | Ichikawa et al. | 347/171 |
| 2003/0162875 | A1 | 8/2003 | Aketa et al. | |

FOREIGN PATENT DOCUMENTS

| | | | |
|---|---|---|---|
| EP | 0 663 468 | A1 | 12/1994 |
| EP | 764702 | * | 3/1997 |
| EP | 1225211 | A2 * | 7/2002 |
| JP | 58-26376 | B2 | 6/1983 |
| JP | 8-85405 | A | 4/1996 |
| JP | 10-204294 | A | 8/1998 |
| JP | 11-5949 | A | 1/1999 |
| JP | 2002-166806 | A | 6/2002 |
| JP | 2002-241696 | A | 8/2002 |
| JP | 2002-326552 | A | 11/2002 |
| JP | 2003-73553 | A | 3/2003 |
| JP | 2003-253121 | A | 9/2003 |

* cited by examiner

*Primary Examiner*—Justin Fischer
(74) *Attorney, Agent, or Firm*—Birch, Stewart, Kolasch & Birch, LLP

(57) ABSTRACT

When an air bag is prepared by laying a pair of silicone rubber-impregnated and/or coated base fabric pieces one on the other, with the coated surfaces of the pieces inside, and joining peripheral portions of the pieces together to form a bag, an addition curable silicone rubber composition which is loaded with aluminum hydroxide powder and cures into a silicone rubber having an elongation at break of at least 1000% is used as a sealer and applied to the peripheral portions of the base fabric pieces, thereby achieving improved adhesion therebetween.

10 Claims, 1 Drawing Sheet

1

AIR BAG SEALER SILICONE RUBBER COMPOSITION

This Non-provisional application claims priority under 35 U.S.C. § 119(a) on Patent Application No(s). 2003-121406 filed in Japan on Apr. 25, 2003, the entire contents of which are hereby incorporated by reference.

TECHNICAL FIELD

This invention relates to a process of preparing an air bag by laying a pair of base fabric pieces impregnated and/or coated with silicone rubber one on the other, with the coated surfaces of the pieces inside, and joining peripheral portions of the pieces together to form a bag, and more particularly, to a silicone rubber composition for use as a sealer to be applied to the peripheral portions of the base fabric pieces prior to joining.

BACKGROUND OF THE INVENTION

One typical process for preparing an air bag involves the steps of furnishing a pair of base fabric pieces impregnated and/or coated with silicone rubber, laying the pieces one on the other, with the coated surfaces of the pieces inside, and bonding or stitching peripheral portions of the pieces together to form a bag. An attempt has been made to apply an adhesive silicone rubber composition as a sealer to the peripheral portions of the base fabric pieces prior to bonding or stitching. With the state of the art, it is very difficult to bond an uncured silicone rubber composition to once cured silicone rubber.

Applicants previously proposed an addition reaction curing type silicone rubber composition filled with calcium carbonate as an air bag sealer (see JP-A 2003-253121 corresponding to US2003-0162875). It would be desirable to have an air bag sealer having further improved adherence.

SUMMARY OF THE INVENTION

An object of the present invention is to provide, in connection with the aforementioned air bag preparation process, a silicone rubber composition which is applicable as a sealer to the peripheral portions of the silicone rubber-coated base fabric pieces prior to bonding or stitching and develops good adherence thereto.

In connection with a process of preparing an air bag by laying a pair of base fabric pieces impregnated and/or coated with silicone rubber one on the other, with the coated surfaces of the pieces inside, and bonding or stitching peripheral portions of the pieces together to form a bag, the present invention provides an addition curable silicone rubber composition which is filled with aluminum hydroxide powder and cures into a silicone rubber having an elongation at break of at least 1000%. The silicone rubber composition is suited for use as a sealer to be applied to the peripheral portions of the base fabric pieces prior to bonding or stitching and develops good adherence to the base fabric pieces.

DETAILED DESCRIPTION OF THE INVENTION

Figure 1:
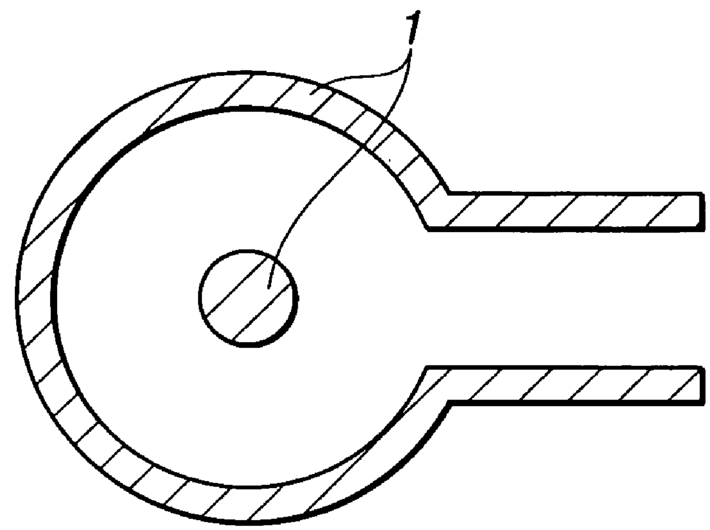
FIG. 1 illustrates an inflation test for adherence evaluation where an adhesive silicone rubber composition is applied to a base fabric piece in a pattern to form a bag.

The present invention relates to a process for preparing an air bag by furnishing a pair of base fabric pieces impregnated and/or coated with silicone rubber, laying the pieces one on the other, with the coated surfaces of the pieces faced inside, and bonding or stitching peripheral portions of the pieces together to form a bag. The silicone rubber composition of the present invention is used as a sealer, that is, applied to the peripheral portions of the base fabric pieces prior to the bonding or stitching step for establishing a firm bond between the peripheral portions after the bonding or stitching step. Thus the bonded or stitched portions are tightly sealed.

The type of base fabric, the type of silicone rubber composition affording the silicone rubber with which the base fabric is impregnated and/or coated (including curable silicone rubber compositions of different types, for example, organic peroxide curing type, addition reaction curing type, condensation reaction curing type, and UV curing type), and the impregnating or coating method (for example, coating, imprinting, screen printing and dipping) may be well-known types or methods. Namely, any desired base fabric can be impregnated or coated with any desired silicone rubber composition by well-known means.

The air bag sealer silicone rubber composition of the present invention is a silicone rubber composition of the addition curing type which cures into a silicone rubber having an elongation at break of at least 1,000%, desirably at least 1,200% and more desirably at least 1,400%. The upper limit of elongation is usually up to 2,500%, desirably up to 2,000%, though not critical.

The elongation at break is measured by the following method. A cured silicone rubber sheet of 1 mm thick was punched using a dumbbell cutter according to ASTM D1822L. The dumbbell specimen is marked with gages spaced apart 1 cm. With one end of the dumbbell secured, the other end is pulled at a constant rate of 300 mm/min until the dumbbell specimen is broken. A percent elongation at this point is determined.

According to the invention, an aluminum hydroxide powder is compounded in the addition curable silicone rubber composition. A preferred embodiment is an addition reaction curing type silicone rubber composition comprising (i) an organopolysiloxane containing at least two alkenyl radicals in a molecule, (ii) an organohydrogenpolysiloxane containing at least two silicon atom-bonded hydrogen atoms in a molecule, and (iii) a platinum group metal catalyst. Desirably the composition further contains (iv) an organopolysiloxane resin having siloxane units containing alkenyl radicals and siloxane units of the formula: $SiO_{4/2}$ in a molecule, and more desirably (v) an alkoxysilane or a partial hydrolytic condensate thereof. In any of these preferred compositions, (vi) an aluminum hydroxide powder must be incorporated. These components are described in more detail.

(i) Alkenyl-containing Organopolysiloxane

The alkenyl-containing organopolysiloxane used herein is a base polymer in the silicone rubber composition and should contain at least two alkenyl radicals in a molecule. Most often, it is a linear one whose backbone consists essentially of recurring diorganosiloxane units and which is blocked with triorganosiloxy radicals at both ends of its molecular chain. It may contain a branched structure in part in its molecular structure or even be cyclic. From the standpoint of mechanical strength and other physical properties of the cured product, a linear diorganopolysiloxane is preferred. The alkenyl radicals may be attached only at the ends of the molecular chain or at the ends and intermediates of the molecular chain. Typically, the alkenyl-containing diorganopolysiloxane is represented by the general formula (1):

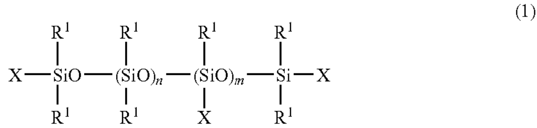

(1)

wherein $R^1$ is each independently a substituted or unsubstituted monovalent hydrocarbon radical free of aliphatic unsaturation, X is an alkenyl radical, n is 0 or an integer of at least 1, m is 0 or an integer of at least 1.

Examples of suitable substituted or unsubstituted monovalent hydrocarbon radicals free of aliphatic unsaturation represented by $R^1$ include alkyl radicals such as methyl, ethyl, propyl, isopropyl, butyl, isobutyl, tert-butyl, pentyl, neopentyl, hexyl, heptyl, octyl, nonyl, decyl and dodecyl; cycloalkyl radicals such as cyclopentyl, cyclohexyl and cycloheptyl; aryl radicals such as phenyl, tolyl, xylyl, naphthyl and biphenylyl; aralkyl radicals such as benzyl, phenylethyl, phenylpropyl and methylbenzyl; and substituted radicals of the foregoing in which some or all of the carbon atom-bonded hydrogen atoms are substituted with halogen atoms (e.g., fluoro, chloro, bromo), cyano radicals or the like, such as chloromethyl, 2-bromoethyl, 3-chloropropyl, 3,3,3-trifluoropropyl, chlorophenyl, fluorophenyl, cyanoethyl and 3,3,4,4,5,5,6,6,6-nonafluorohexyl. Those radicals having 1 to 10 carbon atoms, especially 1 to 6 carbon atoms are typical. Of these, preferred are substituted or unsubstituted alkyl radicals having 1 to 3 carbon atoms such as methyl, ethyl, propyl, chloromethyl, bromoethyl, 3,3,3-trifluoropropyl and cyanoethyl and substituted or unsubstituted phenyl radicals such as phenyl, chlorophenyl and fluorophenyl.

Examples of suitable alkenyl radicals represented by X include those having about 2 to about 8 carbon atoms such as vinyl, allyl, propenyl, isopropenyl, butenyl, hexenyl and cyclohexenyl, with lower alkenyl radicals such as vinyl and allyl being preferred.

In formula (1), n is an integer of 0, 1 or greater, m is an integer of 0, 1 or greater. Preferably n and m are integers satisfying $10 \leqq n+m \leqq 10{,}000$, and more preferably $50 \leqq n+m \leqq 2{,}000$ and $0 \leqq m/(n+m) \leqq 0.2$.

These alkenyl-containing diorganopolysiloxanes should preferably have a viscosity of about 10 to about 1,000,000 cSt at 25° C., more preferably about 100 to about 500,000 cSt at 25° C.

(ii) Organohydrogenpolysiloxane

The organohydrogenpolysiloxane serves as a crosslinking agent and contains at least two, preferably at least three hydrogen atoms each attached to a silicon atom (i.e., SiH radicals) in a molecule. The organohydrogenpolysiloxane may have a linear, branched or cyclic structure or be a resinous one having three-dimensional network structure. The upper limit of the number of SiH radicals per molecule is usually about 300 or less, preferably about 100 or less, though not critical. The organohydrogenpolysiloxane desirably has a degree of polymerization of about 2 to about 300, more desirably about 3 to about 150 (which corresponds to the number of silicon atoms per molecule). It is noted that the SiH radicals may be positioned at the end or an intermediate of the molecular chain or both.

Most often, the organohydrogenpolysiloxane (C) is represented by the following average compositional formula (2).

$$H_aR^2_bSiO_{(4-a-b)/2} \quad (2)$$

In formula (2), $R^2$ is independently a substituted or unsubstituted monovalent hydrocarbon radical free of aliphatic unsaturation, "a" and "b" are numbers satisfying $0.001 \leqq a < 2$, $0.7 \leqq b \leqq 2$ and $0.8 \leqq a+b \leqq 3$, preferably $0.01 \leqq a \leqq 1$, $1 \leqq b \leqq 2$ and $1.01 \leqq a+b \leqq 3$, and more preferably $0.05 \leqq a \leqq 1$, $1.5 \leqq b \leqq 2$ and $1.8 \leqq a+b \leqq 2.7$.

Examples of suitable substituted or unsubstituted monovalent hydrocarbon radicals free of aliphatic unsaturation represented by $R^2$ are as exemplified for $R^1$ in formula (1). Monovalent hydrocarbon radicals having 1 to 10 carbon atoms, especially 1 to 7 carbon atoms are typical. Of these, lower alkyl radicals having 1 to 3 carbon atoms such as methyl and 3,3,3-trifluoropropyl are preferred as well as phenyl.

Examples of the organohydrogenpolysiloxane include siloxane oligomers such as 1,1,3,3-tetramethyldisiloxane, 1,3,5,7-tetramethyltetracyclosiloxane, and 1,3,5,7,8-pentamethylpentacyclosiloxane; both end trimethylsiloxy-blocked methylhydrogenpolysiloxane, both end trimethylsiloxy-blocked dimethylsiloxane-methylhydrogensiloxane copolymers, both end silanol-blocked methylhydrogenpolysiloxane, both end silanol-blocked dimethylsiloxane-methylhydrogensiloxane copolymers, both end dimethylhydrogensiloxy-blocked dimethylpolysiloxane, both end dimethylhydrogensiloxy-blocked methylhydrogenpolysiloxane, both end dimethylhydrogensiloxy-blocked dimethylsiloxane-methylhydrogensiloxane copolymers; and silicone resins comprising $R_2(H)SiO_{1/2}$ units and $SiO_{4/2}$ units and optionally, $RSiO_{3/2}$ units, $R_2SiO_{2/2}$ units, $R(H)SiO_{2/2}$ units, $(H)SiO_{3/2}$ units or $RSiO_{3/2}$ units wherein R is a substituted or unsubstituted monovalent hydrocarbon radical as exemplified above for $R^1$. Also included are those represented by the following formulae.

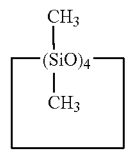

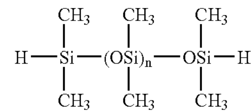

n is an integer of 1 to 50.

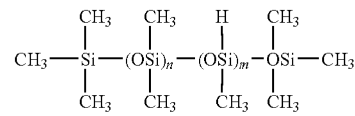

n is an integer of 0 to 40, m is an integer of 2 to 40, m+n=2 to 80.

The organohydrogenpolysiloxane used herein can be prepared by well-known methods, for example, by co-hydrolyzing at least one chlorosilane selected from the general formulae: $R^2SiHCl_2$ and $R^2_2SiHCl$ wherein $R^2$ is as defined above, or by co-hydrolyzing a mixture of the foregoing chlorosilane and at least one chlorosilane selected from the general formulae: $R^2_3SiCl$ and $R^2_2SiCl_2$ wherein $R^2$ is as defined above.

If desired, the polysiloxane resulting from such cohydrolysis is further subjected to equilibration reaction, resulting in an organohydrogenpolysiloxane which is also useful.

Component (ii) is preferably used in such amounts that 0.5 to 4 moles, more preferably 0.8 to 2.5 moles of silicon atom-bonded hydrogen atoms (i.e., SiH radicals) in the organohydrogenpolysiloxane (ii) are present per mole of alkenyl radicals in the alkenyl-containing organopolysiloxane (i) or in components (i) and (iv) combined if component (iv) to be described later has alkenyl radicals such as vinyl.

(iii) Platinum Group Metal Catalyst

The platinum group metal catalyst used herein is a catalyst for promoting the addition reaction between alkenyl radicals in component (i) and silicon atom-bonded hydrogen atoms in component (ii). Well-known catalysts used in hydrosilylation reaction are useful. Exemplary catalysts are platinum, palladium and rhodium base catalysts including elemental platinum group metals such as platinum (inclusive of platinum black), rhodium and palladium; platinum chloride, chloroplatinic acid and chloroplatinic acid salts such as $H_2PtCl_4.nH_2O$, $H_2PtCl_6.nH_2O$, $NaHPtCl_6.nH_2O$, $KHPtCl_6.nH_2O$, $Na_2PtCl_6.nH_2O$, $K_2PtCl_4.nH_2O$, $PtCl_4.nH_2O$, $PtCl_2$ and $Na_2HPtCl_4.nH_2O$ wherein n is an integer of 0 to 6, preferably 0 or 6; alcohol-modified chloroplatinic acid (see U.S. Pat. No. 3,220,972); complexes of chloroplatinic acid with olefins (see U.S. Pat. Nos. 3,159,601, 3,159,662 and 3,775,452); platinum group metals such as platinum black and palladium on carriers such as alumina, silica and carbon; rhodium-olefin complexes; chlorotris(triphenylphosphine)rhodium (known as Wilkinson catalyst); and complexes of platinum chloride, chloroplatinic acid or chloroplatinic acid salts with vinyl-containing siloxanes, especially vinyl-containing cyclic siloxanes.

The catalyst (iii) is used in a catalytic amount, typically about 0.1 to 1,000 parts, preferably about 0.1 to 500 parts, and more preferably about 0.5 to 200 parts by weight of platinum group metal per million parts by weight of components (i) and (ii) combined.

(iv) Organopolysiloxane Resin

Preferably, an organopolysiloxane resin is added to the silicone rubber composition. It is an organopolysiloxane resin of three-dimensional network structure containing essentially branched units represented by $SiO_2$ units and/or $RSiO_{3/2}$ units, and optionally, $R_3SiO_{1/2}$ units and/or $R_2SiO$ units wherein R is a monovalent hydrocarbon radical such as alkyl, alkenyl or aryl. Inclusion of this organopolysiloxane resin increases the strength of silicone rubber. Exemplary organopolysiloxane resins are resins consisting of $(CH_3)_3SiO_{1/2}$ units and $SiO_{4/2}$ units, resins consisting of $(CH_3)_3SiO_{1/2}$ units, $(CH_2{=}CH)SiO_{3/2}$ units and $SiO_{4/2}$ units, resins consisting of $(CH_2{=}CH)(CH_3)_2SiO_{1/2}$ units and $SiO_{4/2}$ units, and resins consisting of $(CH_2{=}CH)(CH_3)_2SiO_{1/2}$ units, $(CH_2{=}CH)SiO_{3/2}$ units and $SiO_{4/2}$ units. In particular, those resins having alkenyl radicals, typically vinyl are effective for improving the strength of the compositions when they are incorporated into the crosslinked structure.

The organopolysiloxane resin (iv) is preferably blended in amounts of about 0.01 to 30 parts by weight, more preferably about 0.1 to 15 parts by weight per 100 parts by weight of the alkenyl-containing organopolysiloxane (i).

(v) Alkoxysilane or Partial Hydrolytic Condensate

Suitable alkoxysilanes and partial hydrolytic condensates thereof are tetrafunctional alkoxysilanes including tetraalkoxysilanes such as tetramethoxysilane and tetraethoxysilane; and trifunctional alkoxysilanes including organotrialkoxysilanes, typically alkyltrialkoxysilanes, alkenyltrialkoxysilanes and aryltrialkoxysilanes such as methyltrimethoxysilane, methyltriethoxysilane, ethyltrimethoxysilane, vinyltrimethoxysilane, phenyltrimethoxysilane, and methyltri(methoxyethoxy)silane, and alkoxysilanes having epoxy or amino-containing substituent radicals such as γ-glycidoxypropyltrimethoxysilane and γ-aminopropyltriethoxysilane, and partial hydrolytic condensates of the foregoing. They may be used alone or in admixture of two or more.

The alkoxysilane or partial hydrolytic condensate thereof (v) is preferably blended in amounts of about 0.1 to 10 parts by weight, more preferably about 0.5 to 5 parts by weight per 100 parts by weight of component (i).

(vi) Aluminum Hydroxide Powder

Aluminum hydroxide powder is compounded in the inventive silicone rubber composition. In the aluminum hydroxide powder, surfaces of particles may or may not have been treated. When aluminum hydroxide particles are surface treated prior to compounding, use may be made of suitable surface treating agents including silane coupling agents such as alkoxysilanes possessing monovalent hydrocarbon groups containing functional radicals such as alkenyl, epoxy, amino, (meth)acryloxy or mercapto radicals, and partial hydrolytic condensates thereof, i.e., siloxane oligomers; alkoxysilanes as exemplified above for component (v) and partial hydrolytic condensates thereof, i.e., siloxane oligomers; organosilazanes such as hexamethyldisilazane, tetramethyldivinyldisilazane, tetravinyldimethyldisilazane and hexamethyldivinyltrisilazane; resin acids and fatty acids. From the standpoints of fluidity and reinforcement, aluminum hydroxide powder having an average particle size of 0.01 to 50 μm, especially 0.05 to 10 μm is preferred. The average particle size is determined as a weight average value $D_{50}$ or median diameter in particle size distribution measurement by the laser light diffraction method.

The aluminum hydroxide powder generally retains some moisture. Moisture may be removed if desired. Moisture removal is carried out, for example, by mixing a dimethylpolysiloxane with aluminum hydroxide powder and heat treating the mixture. The heating temperature is usually 50° C. or higher, preferably 80 to 200° C., and a reduced pressure may be employed for promoting the heat treatment. By this heat treatment, the aluminum hydroxide powder which has not been surface treated is substantially treated with the dimethylpolysiloxane whereby the moisture is released. When the addition reaction curing type silicone rubber composition is loaded with such dry aluminum hydroxide powder, the composition can be stabilized without chemically altering the organohydrogenpolysiloxane (ii).

When the aluminum hydroxide powder is incorporated in the addition reaction curing type silicone rubber composition, the composition develops dramatically improved adhesion to neat nylon fabrics and nylon fabrics surface coated with silicone rubber as used in air bags. The improvement in adhesion makes a contribution to the seal of an air bag when it is actuated and inflated in an accident.

The aluminum hydroxide powder (vi) is preferably blended in amounts of about 0.1 to 200 parts by weight, more preferably about 10 to 100 parts by weight per 100 parts by weight of component (i). Outside the range, less amounts of aluminum hydroxide achieve little or no addition effects. When compositions loaded with aluminum hydroxide are allowed to stand for a long time at elevated temperature (e.g., more than 100 hours at 110° C.), excessive amounts of aluminum hydroxide may adversely affect the rubber physical properties of cured silicone rubber, which often becomes brittle.

Other Components

In addition to the above-described components (i) to (vi), there may be added to the inventive composition reinforcing inorganic fillers such as fumed silica and fumed titanium dioxide; reinforcing silicone resins; and non-reinforcing inorganic fillers such as calcium silicate, titanium dioxide, ferric oxide, and carbon black. These inorganic fillers are generally used in amounts of 0 to 200 parts by weight per 100 parts by weight of all the components excluding the inorganic fillers. It is also acceptable to add organic titanium compounds such as titanium chelates and organic titanic acid esters. The organic titanium compounds are generally used in amounts of 0 to 10 parts by weight, preferably 0.1 to 5 parts by weight per 100 parts by weight of all the components excluding the inorganic fillers.

Curable Silicone Rubber Composition and Cured Product

Like conventional curable silicone rubber compositions, the inventive composition may be formulated as a two part composition wherein two parts are kept separate and on use, mixed together for curing. Independent of whether the inventive composition is one part type or two part type, an epoxy radical-containing polysiloxane compound or ester siloxane compound may be additionally included in the composition if desired for improving the adhesion of the composition. The resulting composition is also improved in flow.

Under the same conditions as used for well-known addition reaction curing type silicone rubber compositions, the inventive composition can be cured. For example, the inventive composition cures satisfactorily at room temperature, but can be heated for curing if desired.

EXAMPLE

Examples of the invention are given below by way of illustration and not by way of limitation.

Examples 1-5 & Comparative Examples 1-2

Using the components described below, silicone rubber compositions of the formulation shown in Table 1 were prepared. The compositions were evaluated by several tests, with the results shown in Table 1. Note that Me is methyl and Vi is vinyl.

Components (A-1) Untreated aluminum hydroxide powder
 H-42 by Showa Denko K. K. average particle size 1.1 μm (A-2) Surface treated aluminum hydroxide powder
 H42STV by Showa Denko K. K. average particle size 1.1 μm surface treating agent: vinyltrimethoxysilane (A-3) Surface treated aluminum hydroxide powder
 H42S by Showa Denko K. K. average particle size 1.1 μm surface treating agent: stearic acid (B) Organopolysiloxane
 Vinyl-containing linear organopolysiloxane represented by the formula:

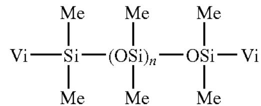

wherein n is such a number that the siloxane has a viscosity of 100,000 cSt at 25° C.

(C-1) Organohydrogenpolysiloxane

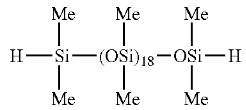

(C-2) Organohydrogenpolysiloxane

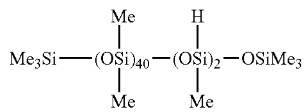

(D) Platinum group metal catalyst
 platinum-divinyltetramethyldisiloxane complex in toluene (Pt content 0.5 wt %)

(E) Reinforcing resin
 vinyl-containing methylpolysiloxane resin composed of $Vi(Me)_2SiO_{1/2}$ units and $SiO_{4/2}$ units (F) Alkoxysilane or partial hydrolytic condensate
 phenyltrimethoxysilane KBM103 by Shin-Etsu Chemical Co., Ltd.

(G) Reinforcing inorganic filler
 fumed silica treated with dimethylpolysiloxane and hexamethyldisilazane (H) Cure regulating agent
 50% ethynyl cyclohexanol in toluene (I) Organotitanium compound
 $Ti[OCH_2CH(C_2H_5)(CH_2)_3CH_3]_4$ Runs were carried out using the foregoing components. Components (A) and (B) were mixed. The mixture was heat treated at 150° C. for 2 hours under a reduced pressure. After cooling to room temperature, the mixture was compounded with components (C), (D), (E), (F), (G), (H) and (I) under a reduced pressure, yielding an adhesive silicone rubber composition.

Tests

Peel Test and Cohesive Failure:

Two fabric pieces coated with silicone rubber were mated together, with the coated surfaces faced inside. At this point, the adhesive silicone rubber composition was applied therebetween to a thickness of 0.5 mm. After the silicone rubber composition was cured, the fabric pieces were peeled apart using a testing machine Strograph. A peel adhesion strength (N/cm) was measured and a percent cohesive failure at the adhesion interface was computed.

Elongation at Break:

Measured according to JIS K6251. The adhesive silicone rubber composition was cured into a silicone rubber sheet of 1 mm thick, which was punched using a dumbbell cutter according to ASTM D1822L. The dumbbell specimen was marked with gages spaced apart 1 cm. With one end of the dumbbell secured, the other end was pulled at a constant rate of 300 mm/min until the dumbbell specimen was broken. A percent elongation at break was determined.

Figure 2:
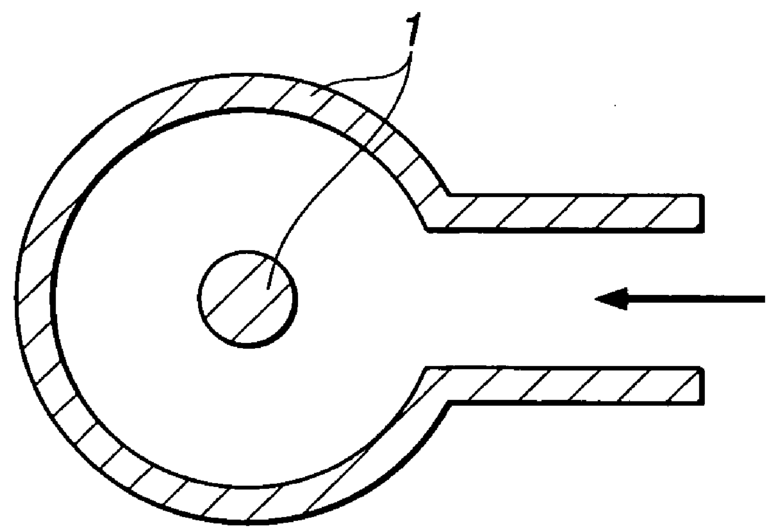
FIG. 2 illustrates how to inject air into the bag.

Inflation Test Adhesion:

A test was carried out according to the actual usage of an air bag. Fabric pieces surface coated with silicone rubber were furnished. On the rubber-coated surface of one fabric piece, the uncured adhesive silicone rubber composition was applied in the hatched pattern shown in FIG. 1. The other fabric piece was laid thereon, with the rubber-coated surface faced inside. The assembly was held at 23° C. for one day for curing whereby the fabric pieces were joined to form a bag. Air under 7 atmospheres was injected into the bag for 0.5 second from the open end as shown by the arrow in FIG. 2. The bonded state of the adhesive silicone rubber composition was observed. It was rated OK when cohesive failure occurred, and NG when interfacial peeling occurred. It is understood that FIGS. 1 and 2 are plan views of an air bag as viewed from above.

TABLE 1

| Components | Comparative Example | | Example | | | | |
|---|---|---|---|---|---|---|---|
| (pbw) | 1 | 2 | 1 | 2 | 3 | 4 | 5 |
| A-1 | 0 | 0 | 35 | 25 | 20 | 0 | 0 |
| A-2 | 0 | 0 | 0 | 0 | 0 | 20 | 0 |
| A-3 | 0 | 0 | 0 | 0 | 0 | 0 | 20 |
| B | 94 | 94 | 94 | 94 | 94 | 94 | 94 |
| C-1 | 1.9 | 1.9 | 1.9 | 1.9 | 1.9 | 1.9 | 1.9 |
| C-2 | 8.7 | 8.7 | 8.7 | 8.7 | 8.7 | 8.7 | 8.7 |
| D | 0.5 | 0.5 | 0.5 | 0.5 | 0.5 | 0.5 | 0.5 |
| E | 7.5 | 7.5 | 7.5 | 7.5 | 7.5 | 7.5 | 7.5 |
| F | 1 | 1 | 1 | 1 | 1 | 1 | 1 |
| G | 21 | 30 | 21 | 21 | 21 | 21 | 21 |
| H | 0 | 0 | 0.15 | 0.15 | 0.15 | 0.15 | 0.15 |
| I | 0.5 | 0.5 | 0.5 | 0.5 | 0.5 | 0.5 | 0.5 |
| Peel strength (N/cm) | 2.0 | 2.7 | 6.0 | 6.3 | 4.7 | 4.8 | 5.0 |
| Cohesive failure (%) | 20 | 80 | 100 | 100 | 100 | 100 | 100 |
| Elongation at break (%) | 800 | 850 | 1100 | 1300 | 1400 | 1450 | 1450 |
| Inflation test adhesion | NG | NG | OK | OK | OK | OK | OK |

In Comparative Examples 1 and 2, aluminum hydroxide was not added. Comparative Example 1 contained a less amount of the reinforcing inorganic filler than Comparative Example 2. Comparative Example 2 containing a more amount of the reinforcing inorganic filler developed better adhesion than Comparative Example 1, but not to a satisfactory extent.

Examples 1 to 3 contained different amounts of untreated aluminum hydroxide powder, which gave satisfactory results including a cohesive failure of 100%. Satisfactory adhesion was developed even when the amount of aluminum hydroxide was reduced. The results of the inflation test were also satisfactory.

Examples 4 and 5 contained surface treated aluminum hydroxide powder. A comparison with Example 3 which contains untreated aluminum hydroxide powder reveals no difference in adhesion whether the aluminum hydroxide has been treated or not. The results of the inflation test were also satisfactory.

When silicone rubber-impregnated and/or coated fabric pieces are mated, with their coated surfaces inside, and joined along a periphery to form a bag, the adhesive silicone rubber compositions of Examples having surface-treated or untreated aluminum hydroxide added thereto are used as a sealer where the peripheral portions of the fabric pieces are joined together, whereby an improved bond is established between the peripheral portions of the fabric pieces.

In an air bag prepared by laying a pair of base fabric pieces impregnated and/or coated with silicone rubber one on the other, with the coated surfaces of the pieces inside, and bonding or stitching peripheral portions of the pieces together to form a bag, the silicone rubber composition of the invention is used as a sealer and applied to the peripheral portions of the base fabric pieces, thereby achieving improved adhesion therebetween.

Japanese Patent Application No. 2003-121406 is incorporated herein by reference.

Reasonable modifications and variations are possible from the foregoing disclosure without departing from either the spirit or scope of the present invention as defined by the claims.

The invention claimed is:

1. A method of improving adherence between a first silicone rubber which is obtained by curing an air bag sealer silicone rubber composition and a second silicone rubber with which base fabric pieces are impregnated and/or covered, comprising:

laying a pair of the base fabric pieces impregnated and/or coated with the second silicone rubber one on the other, with the coated surfaces of the pieces inside;

applying as a sealer an addition reaction curing type silicone rubber composition to peripheral portions of the base fabric pieces to be jointed;

bonding or sticking the peripheral portions of the pieces together to form a bag; and curing the addition reaction curing type silicone rubber composition to seal the bonding or sticking portion with the first silicone rubber, wherein said addition reaction curing type silicone rubber composition comprises (i) an organopolysiloxane containing at least two alkenyl radicals in a molecule, (ii) an organohydrogenpolysiloxane containing at least two silicon atom-bonded hydrogen atoms in a molecule, (iii) a platinum group metal catalyst, and (iv) an inorganic filler comprising an aluminum hydroxide in an amount of 21.3 to 37.2 parts by weight per 100 parts by weight of component (i), and silica in an amount of 14.1 to 15.6 parts by weight per 100 parts by weight of all the components excluding silica, the first silicone rubber having an elongation at break of at least 1000%.

2. The method of claim 1, wherein the aluminum hydroxide powder is untreated or surface treated with an agent selected from the group consisting of fatty acids, resin acids, organosilazanes and alkoxysilanes.

3. The method of claim 1, wherein the aluminum hydroxide powder has an average particle size of 0.01 to 50 μm.

4. The method of claim 1, wherein the addition curable silicone rubber composition further comprises (v) an organopolysiloxane resin comprising alkenyl-containing siloxane units and siloxane units of the formula: $SiO_{4/2}$ in a molecule.

5. The method of claim 4, wherein the composition further comprises an alkoxysilane or a partial hydrolytic condensate thereof.

6. The method of claim 4, wherein the composition further comprises an organic titanium compound.

7. The method of claim 5, wherein the composition further comprises an organic titanium compound.

8. The method of claim 1, wherein said addition reaction curing type silicone rubber composition comprises (i) 100 parts by weight of an organopolysiloxane containing at least two alkenyl radicals in a molecule, (ii) an organohydrogenpolysiloxane containing at least two silicon atom-bonded hydrogen atoms in a molecule in such an amount that 0.5 to 4 moles of silicon atom-bonded hydrogen atoms in the organohydrogenpolysiloxane (ii) are present per mole of alkenyl radicals in the alkenyl-containing organopolysiloxane (i), (iii) a platinum group metal catalyst in such an amount that 0.1 to 1,000 parts by weight of platinum group metal per million parts by weight of components (i) and (ii) combined, and (iv) an inorganic filler consisting of an aluminum hydroxide powder and silica, the aluminum hydroxide powder being present in an amount of 21.3 to 37.2 parts by weight per 100 parts by weight of component (i), and silica is blended in an amount of 14.1 to 15.6 parts by weight per 100 parts by weight of all the components excluding silica.

9. The method of claim 4, wherein the organopolysiloxane resin (v) is blended in an amount of 0.01 to 30 parts by weight per 100 parts by weight of the alkenyl- containing organopolysiloxane (i), and the organohydrogenpolysiloxane (ii) is blended in such an amount that 0.5 to 4 moles of silicon atom-bonded hydrogen atoms in the organohydrogenpolysiloxane (ii) are present per mole of alkenyl radicals in components (i) and (iv) combined.

10. The method of claim 1, wherein the silica is a fumed silica.

* * * * *